United States Patent [19]

Meginnis

[11] 3,941,460
[45] Mar. 2, 1976

[54] QUICK-OPENING SIGHT GLASS ASSEMBLY

[76] Inventor: Charles E. Meginnis, 529 1/2 Nancy St., Charleston, W. Va. 25302

[22] Filed: Nov. 12, 1974

[21] Appl. No.: 523,276

[52] U.S. Cl. .................................. 350/319; 73/334
[51] Int. Cl.² ............................................ G02B 5/00
[58] Field of Search ...... 350/318, 319; 73/330, 334, 73/326; 220/82 A; 137/559; 116/117 C

[56] References Cited
UNITED STATES PATENTS

| | | | |
|---|---|---|---|
| 3,307,400 | 3/1967 | Leroy | 73/334 |
| 3,345,872 | 10/1967 | Meginnis | 350/319 |
| 3,380,303 | 4/1968 | Leroy | 73/334 |
| 3,438,540 | 4/1969 | Leroy | 350/319 |
| 3,556,038 | 1/1971 | Wolfe | 73/334 |
| 3,625,390 | 12/1971 | Meginnis | 350/319 |
| 3,746,431 | 7/1973 | Meginnis | 73/334 |
| 3,782,809 | 1/1974 | Shrodshire | 350/319 |

Primary Examiner—Archie R. Borchelt
Assistant Examiner—D. C. Nelms
Attorney, Agent, or Firm—Mason, Fenwick & Lawrence

[57] ABSTRACT

A sight glass assembly generally including a first housing section having an opening therethrough, mountable on a container wall having an opening communicating with a fluid contained therein so that the housing section opening registers with the container wall opening, the first housing section opening having an enlarged section including a lens seating surface and a packing bearing surface inclined relative to a longitudinal center line of the first housing section opening, a second housing section having an opening therethrough registered with the first housing section opening, the second housing section opening having an enlarged section including a lens seating surface and a packing bearing surface inclined relative to the longitudinal center line, disposed in opposed relation to the lens seating and packing bearing surfaces of the enlarged section of the opening in the first housing section, a lens disposed in the housing openings, interposed between the seating surfaces, a packing member disposed in the enlarged opening sections, the packing member engaging the bearing surfaces of the housing sections and the periphery of the lens, and means for urging the packing bearing surfacings of the housing sections together whereby the packing is caused to expand laterally to place the lens in lateral compression and to provide a fluid tight seal between the housing sections and the periphery of the lens.

14 Claims, 3 Drawing Figures

U.S. Patent  March 2, 1976  3,941,460
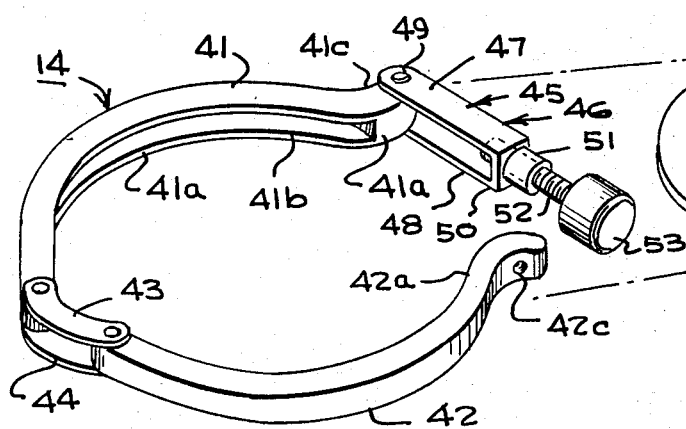
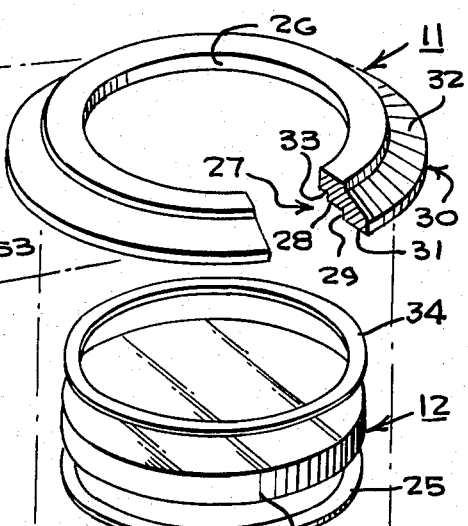
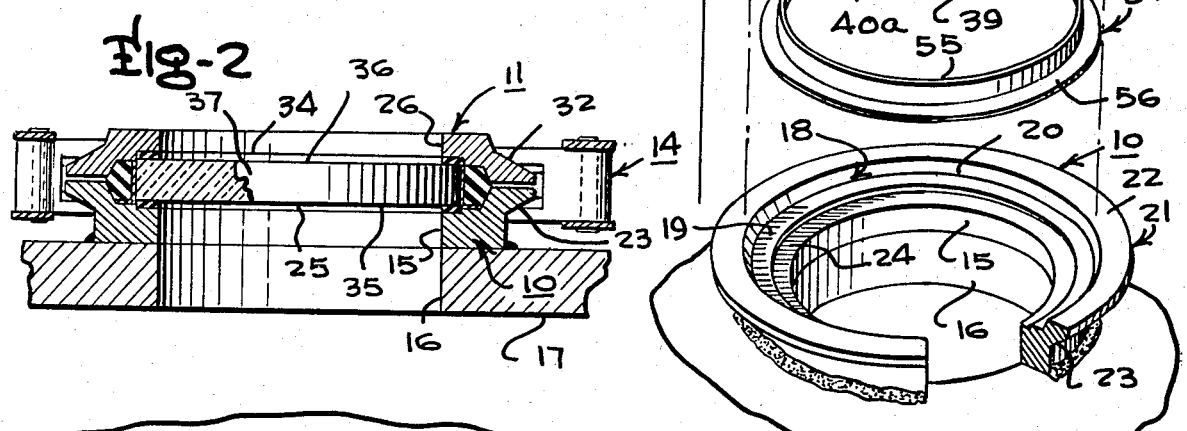
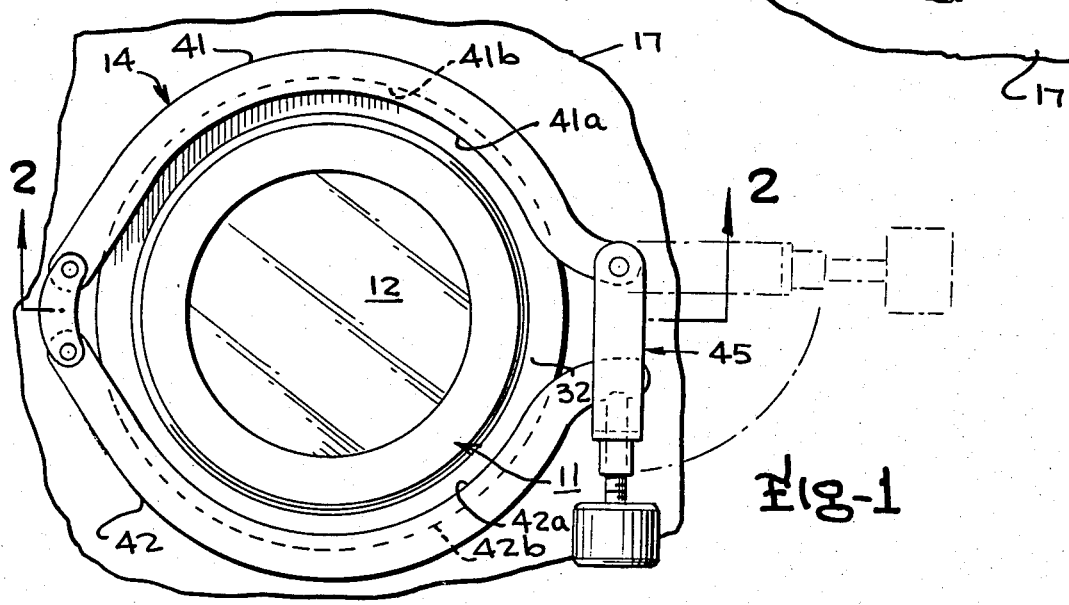

QUICK-OPENING SIGHT GLASS ASSEMBLY

The present invention relates to a sight glass assembly and more particularly to a sight glass assembly suitable for use with large vessels containing fluids under high pressures.

In the prior art, there has been developed a type of sight glass assembly which generally includes a housing structure having an opening therethrough, which is adapted to be mounted across an opening in a vessel containing a fluid under high pressure, and a lens mounted in the opening of the housing. In this particular type of sight glass assembly, it has been found that the principal source of failure has consisted of fractures of the lens resulting in leakage and blowouts. Such cause of sight glass failures have been obviated to a large extent by prior art sight glass designs wherein a packing member is provided between the wall of the housing opening and the periphery of the lens which packing is placed under compression causing it to expand laterally and correspondingly place the lens in radial compression and form a fluid tight seal between the lens and the housing structure.

Although the aforementioned type of sight glass assembly has been found to be highly effective in performance and reliability, it nevertheless has been necessary to disassemble such assemblies for inspection, the replacement of effective or worn components or routine maintenance purposes. Under such circumstances, it has been found to be highly desirable to be able to easily and quickly disassemble and reassemble such units thus minimizing the amount of manual labor involved and the down time of the vessel on which such units are mounted.

Accordingly, it is the principal object of the present invention to provide an improved sight glass assembly.

Another object of the present invention is to provide and improved sight glass assembly for use on vessels containing fluids under high pressures.

A further object of the present invention is to provide an improved sight glass assembly for use in vessels containing corrosive fluids under elevated pressures.

A still further object of the present invention is to provide an improved sight glass assembly of the type utilizing a packing member disposed between a lens and a housing in which such a lens is mounted, which cooperates with other components of the assembly to place the lens under radial compression thus preventing a blowout of the lens upon the lens becoming fractured, and to form a fluid tight seal between the lens and the housing structure.

Another object of the present invention is to provide an improved sight glass assembly utilizing a compressible packing member interposed between the lens and housing thereof, which quickly may be disassemblied and reassemblied for the purposes of inspecting the components thereof, the removal and replacement of defective or worn components and effecting routine maintenance operations.

A further object of the present invention is to provide an improved sight glass assembly of the type utilizing a resilient packing member interposed between a lens and a housing member in which the lens is mounted, which cooperates with other components of the assembly to place the lens in radial compression and to form a fluid tight seal between the lens and the housing structure, which is simple in design, economical to manufacture and highly effective in performance and reliability.

Other objects and advantages of the present invention will become more apparent to those persons having ordinary skill in the art to which the present invention pertains, from the following description taken in conjunction with the accompanying drawing wherein:

FIG. 1 is a top plan view of an embodiment of the invention;

FIG. 2 is a cross-sectional view taken along line 2—2 in FIG. 1; and

FIG. 3 is an exploded view of the embodiment illustrated in FIGS. 1 and 2.

The embodiment illustrated in FIGS. 1 through 3 generally includes an inner housing section 10 and outer housing section 11, a lens 12, a compressible packing member 13 and a clamping assembly 14. Inner housing section 10 generally has an annular configuration, providing an opening 15 therein adapted to register with an opening 16 in a wall 17 of a vessel containing a fluid possibly corrosive in nature and at an elevated pressure. As best illustrated in FIGS. 2 and 3, the inner housing section is secured to the fluid vessel by welding. However, the inner housing section alternatively may be secured to the fluid vessel by means of a plurality of bolts extendiing through suitable openings circumferentially spaced in the inner housing section, which are adapted to register with suitable holes in the wall of the fluid vessel. opening 15 in the inner housing section is provided with an enlarged section 18 which provides an annular bearing surface 19 and a frusto-conically configured packing bearing surface 20. Inner housing member 10 further is provided with a laterally projecting annular flange portion 21 which includes a mating surface 22 disposed substantially perpendicular to the axis of opening 15 and a frusto-conically shaped clamp bearing surface 23. It will be noted that both packing bearing surface 20 and clamp bearing surface 23 are inclined relative to the axis of opening 15. Also, it is to be noted that bearing surface 19 is provided with an annular recess 24 in which there is seated an annular gasket 25.

Outer housing section 11 is similar in configuration to inner housing section 10 and includes an opening 26 therein which registers with opening 15 in the inner housing section. Opening 26 is provided with an enlarged section 27 having an annular packing, bearing surface 28 disposed in opposed relation to seating surface 19 and frusto-conically shaped packing engaging surface 29. outer housing section 11 also includes a laterally projecting annular portion 30 provided with an annular mating surface 31 disposed in opposed relation to mating surface 22 and a frusto-conically shaped clamp bearing surface 32. Similar to the comparable surfaces on the inner housing section, packing bearing surface 29 and clamp bearing surface 32 are inclined relative to the axis of opening 26. Also, bearing surface 28 is provided with an annular recess 33 for seating a gasket 34.

As best illustrated in FIG. 2, lens 12 is mounted within the housing structure between gaskets 25 and 34, having the peripheral portion of inner surface 35 thereof seated on gasket 25, the peripheral portion of outer surface 36 thereof seated on gasket 34, and the peripheral side surface 37 thereof being spaced from packing bearing surfaces 20 and 29 to provide an annular space between the lens and the housing structure.

Packing member 13 is disposed in the annular space provided between the periphery of the lens and the housing structure, and includes an annular surface 38 engaging the periphery of the lens, inner and outer annular surfaces 39 and 40 engaging the lens seating surfaces and frusto-conically shaped surfaces 39a and 40a which engage packing bearing surfaces 20 and 29 of the housing sections.

Clamping assembly 14 consists of a pair of arcuately shaped clamping members 41 and 42 hinged together at one set of ends by a pair of hinge elements 43 and 44 and a connected together at an opposite set of ends by a device 45. The inner surfaces 41a and 42a of the clamping members are provided with recesses 41b and 42b having converging surfaces engaging clamp bearing surfaces 23 and 32 of the housing sections when the clamping assembly is mounted on the housing section with the laterally projecting portions 21 and 30 thereof received in recesses 41b and 42b of the clamping members. The ends of clamping members 41 and 42, opposite the hinged ends thereof, are provided with opposed end portions 41c and 42c which cooperate with the connecting device 45 to draw the clamping members together and correspondingly cause them to engage the housing sections in clamping relation. Connecting device 45 includes a strap member 46 having a pair of spaced leg portions 47 and 48 pivotally connected to end portion 41c by means of a pin 49 and interconnected at the opposite ends thereof by a web portion 50. Mounted on the outer end of web portion 50 is a threaded element 51 in which there is threaded a screw 52 extending through the web portion of strap 46. Screw 52 is provided with an enlarged end portion 53 which may be turned manually to thread the screw into and out of the space between leg portions 47 and 48 of strap 46. It will be seen that when clamping members 41 and 42 are mounted on the housing sections with flanged portions 21 and 30 received within recesses 41b and 42b, the connecting device may be manipulated so that end portion 42c of clamping member 42 is received within the strap portion of the device, and the screw may be turned so that the end of the screw engages clamp end portion 42c to draw the clamping members together and correspondingly clamp the housing sections together.

In the assembly of the embodiment as described, initially, inner housing section 10 is either permanently secured to the vessel wall by welding or detachably secured thereto by bolts so that opening 15 registers with opening 16 in the vessel wall. Next, the outer end face of housing section 11 is placed on a working surface, and gasket 34 is seated in recess 33, the lens is inserted in enlarged opening section 27 so that the periphery of outer surface 36 thereof is seated on gasket 34 and packing member 13 also is inserted in enlarged opening section 27 so that inner surface 38 thereof engages peripheral surface 37 of the lens, surface 40 thereof lens seating surface 28 and surface 40a thereof engages packing bearing surface 29. With the outer housing member, lens and packing member thus preassemblied, gasket 25 is seated in recess 24 of housing section 10, and the preassemblied unit is mounted on inner housing section 10 so that the peripheral portion of inner lens surface 35 engages gasket 25, packing surface 39 engages lens seating surface 19, packing surface 39a engages packing bearing surface 20 and mating surface 31 is disposed in opposed relation to mating surface 22. Under such circumstances, the dimensions of the components will permit the mating surfaces 22 and 31 to be disposed in space relation.

With the preassemblied unit thus mounted on inner housing section 10, clamping assembly 14 may be mounted. This can be accomplished by holding the housing sections together with one hand while manipulating the clamping assembly around flange portions 21 and 30 thereof. FIG. 1 illustrates the simplest method of mounting the clamping assembly which consists of placing clamping member 41 on the upper end of the housing sections so that the upper portions of flange portions 21 and 30 are received in recess 41b. The housing sections with clamping member 41 thus mounted may be held intact with one hand while the other hand can be used to swing depending clamping member 42 upwardly so that the lower portions of flange portions 21 and 30 are received within recess 42b. Connecting device 45 then can be manipulated to receive end portion 42c of the lower clamping member within strap 45 and the screw may be threaded to draw the clamping members together into clamping relation with the flange portions of the housing sections.

As the clamping members are drawn tightly about the mated housing sections, the housing sections will be drawn together thus causing the packing member to expand radially to place the lens under radial compression and correspondingly form a fluid tight seal between the periphery of the lens and the housing sections. In this regard, it particularly is to be noted that the inclined orientations of packing bearing surfaces 20 and 29 of the housing members provide a radially directed, resultant component of force when the housing members are drawn together, to place the lens in radial compression.

To protect the packing member from the possible corrosive effects of the fluid contained within the vessel on which the assembly is mounted, a liner 54 may be used. The liner includes an annular portion 55 interposed between the periphery of the lens and the packing member, and an annular flange portion 56 interposed between the packing member and the lens seating surface of inner housing member 10.

Whenever it becomes necessary to inspect the components of the sight glass assembly, remove and replace any such components or perform a routine maintenance operation, the assembly readily may be dismounted and disassembled merely by loosening the connecting device 45 of the clamping assembly, removing the clamping assembly and then removing the outer housing member. The interior of the assembly then may be inspected or cleaned, any defective or worn components may be replaced and the unit may be reassemblied as previously described.

Since the inner housing member would be exposed to possible corrosive effects of the fluid contained within the vessel, such member should either be fabricated of a material impervious to the effects of the fluid or provided with a protective coating which will withstand any attack of the fluid. Preferably, the packing member should be fabricated of a material also impervious to the effects of the fluid within the vessel. However, any suitable type of packing material may be used in installations where a protective liner is used. Since neither the outer housing member or clamping assembly would be exposed to the fluid within the container, such components may be fabricated of any suitable materials having sufficient strength characterics.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A sight glass assembly comprising a first housing section having an opening therethrough, mountable on a vessel wall having and opening communicating with a fluid contained therein so that said housing section opening registers with said vessel wall opening, said first housing section having an enlarged section including a lens seating surface and a packing bearing surface, said packing bearing surface being inclined relative to a longitudinal center line of said first housing section opening, a second housing section having an opening therethrough registered with said first housing section opening, said second housing section opening having an enlarged section including a lens seating surface and a packing bearing surface, said packing bearing surface being inclined relative to said longitudinal center line, said lens seating and packing bearing surfaces of the enlarged opening section of said second housing section being disposed in opposed relation to the lens seating and packing bearing surfaces of the enlarged opening section of said first housing section, a lens disposed in said housing openings, interposed between said seating surfaces, a packing member disposed in said enlarged opening sections, said packing member engaging said bearing surfaces and a periphery of said lens and means for urging said packing bearing surfaces together whereby said packing is caused to expand laterally to place said lens in lateral compression and to provide a fluid tight seal between said housing sections and the periphery of said lens.

2. A sight glass assembly according to claim 1 wherein said urging means are detachable.

3. A sight glass assembly according to claim 1 wherein said urging means comprise clamping means.

4. A sight glass assembly according to claim 3 wherein said clamping means are detachable.

5. A sight glass assembly according to claim 1 including a liner interposed between said lens and said packing member formed of a material impervious to the effects of any fluid contained within said vessel wall.

6. A sight glass assembly according to claim 5 wherein said liner has an L-shaped cross-sectional configuration including a first section interposed between said lens and said packing member and a second section interposed between said packing member and said first housing section.

7. A sight glass assembly according to claim 1 including gaskets interposed between the peripheries of end surfaces of said lens and said lens seating surfaces.

8. A sight glass assembly according to claim 1 wherein said housing sections include external peripheral bearing surfaces, converging laterally outwardly, and wherein said urging means comprises a clamping assembly including a pair of clamping members hinged together at one set of ends thereof, said clamping members having laterally inwardly diverging surfaces engagable with said laterally outwardly converging bearing surfaces of said housing sections, and means for drawing said clamping members together whereby upon manipulation of said drawing means said housing sections will be drawn together and said packing bearing surfaces are urged toward each other in clamping relation to expand said packing laterally.

9. A sight glass assembly according to claim 8 wherein the periphery of said lens, said packing member and said surfaces of said housing sections are annular, and said clamping members and said surfaces thereof are substantially semi-circular.

10. A sight glass assembly according to claim 8 wherein said means for drawing said clamping members together comprises a screw assembly.

11. A sight glass assembly according to claim 10 wherein said screw assembly comprises a connecting strap pivotally connected to the free end of one of said clamping members and receiving therein the free end of the other said clamping members, and a screw threaded into said strap, having and inner end thereof engagable with the end portion of said other of said clamping members received within said connecting strap.

12. A sight glass assembly according to claim 8 including a gasket interposed between the periphery of each end surface of said lens and an adjacent one of said lens seating surfaces.

13. A sight glass assembly according to claim 8 including a liner interposed between said lens and said packing member formed of a material impervious to the effects of any fluid contained within said vessel.

14. A sight glass assembly according to claim 13 wherein said liner has an L-shaped cross-sectional configuration including a first section interposed between said lens and said packing member and a second section interposed between said packing member and said first housing section.

* * * * *